W. H. SAUVAGE.
SLACK ADJUSTER.
APPLICATION FILED OCT. 22, 1914.

1,213,779.

Patented Jan. 23, 1917.
2 SHEETS—SHEET 1.

WITNESSES:
Fred. Roegerg
W. A. Williams

INVENTOR
Wm. H. Sauvage
BY
R. A. Blair
ATTORNEY

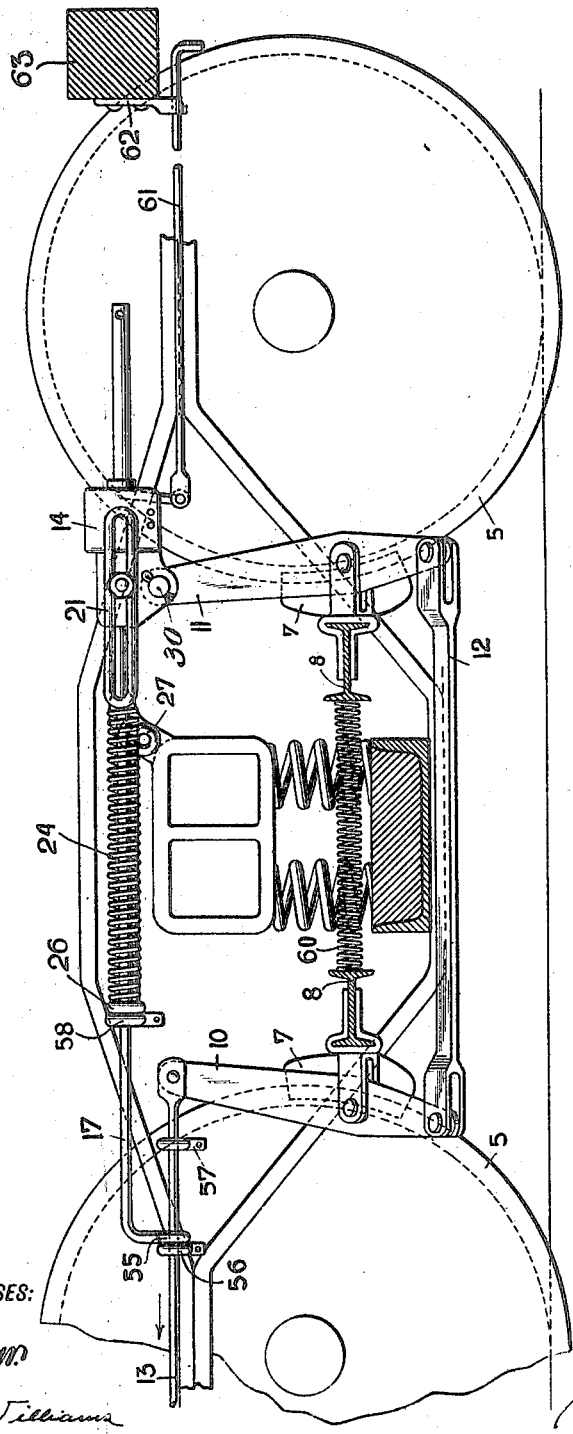

UNITED STATES PATENT OFFICE.

WILLIAM H. SAUVAGE, OF NEW YORK, N. Y., ASSIGNOR, BY MESNE ASSIGNMENTS, TO GOULD COUPLER COMPANY, A CORPORATION OF NEW YORK.

SLACK-ADJUSTER.

1,213,779.

Specification of Letters Patent.

Patented Jan. 23, 1917.

Application filed October 22, 1914. Serial No. 867,972.

*To all whom it may concern:*

Be it known that I, WILLIAM H. SAUVAGE, a citizen of the United States, residing at New York, in the county of New York and State of New York, have invented certain new and useful Improvements in Slack-Adjusters, of which the following is a specification.

This invention relates to slack adjusters for the brake rigging of vehicles, and in its more intense aspect to automatic slack adjusters designed to maintain a standard efficiency in the brake rigging of railway cars.

One of the objects of the present invention is to provide a simple and practical slack adjuster of the above general character which will be reliable and efficient in use and operation.

Another object is to provide a durable slack adjuster of the first above character which will be automatic in its operation and having few parts which will be inexpensive to manufacture, install and maintain.

A further object is to provide an automatic slack adjuster positioned and arranged with respect to the maximum and minimum strains exerted upon the brake rigging to obtain the maximum amount of wear and service out of the various parts.

A further object is to provide a slack adjuster which may be readjusted without going beneath the cars, thereby to fully comply with the rules and regulations of the Interstate Commerce Commission regarding the manual manipulation of brake rigging.

Other objects will be in part obvious from the annexed drawings and in part indicated in connection therewith by the following analysis of this invention.

This invention accordingly consists in the features of construction, combination of parts, and in the unique relations of the members and in the relative proportioning and disposition thereof; all as more completely outlined herein.

To enable others skilled in the art fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1:
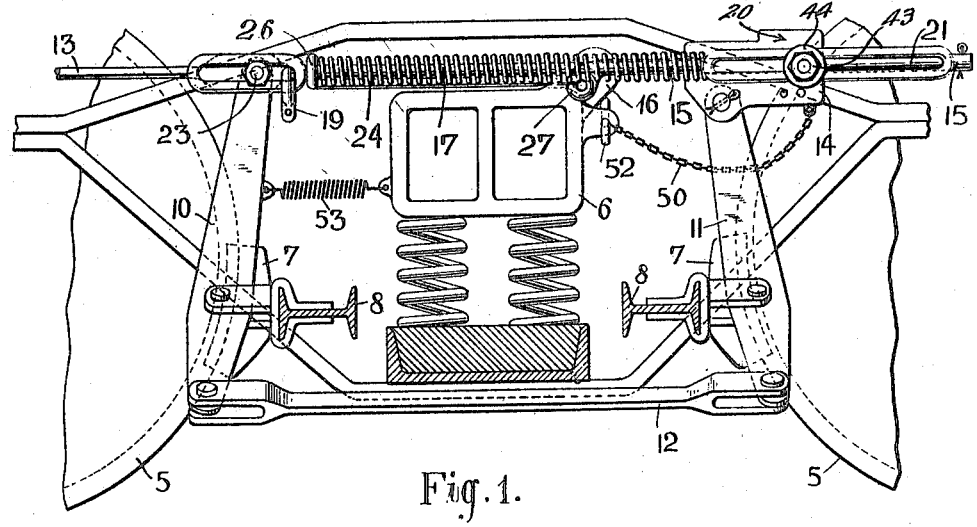
Figure 2:
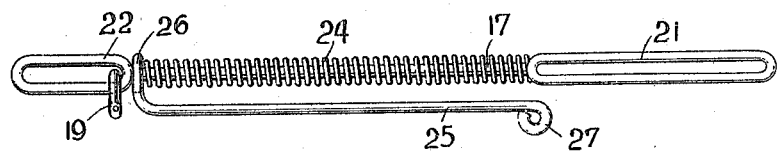
Figure 3:
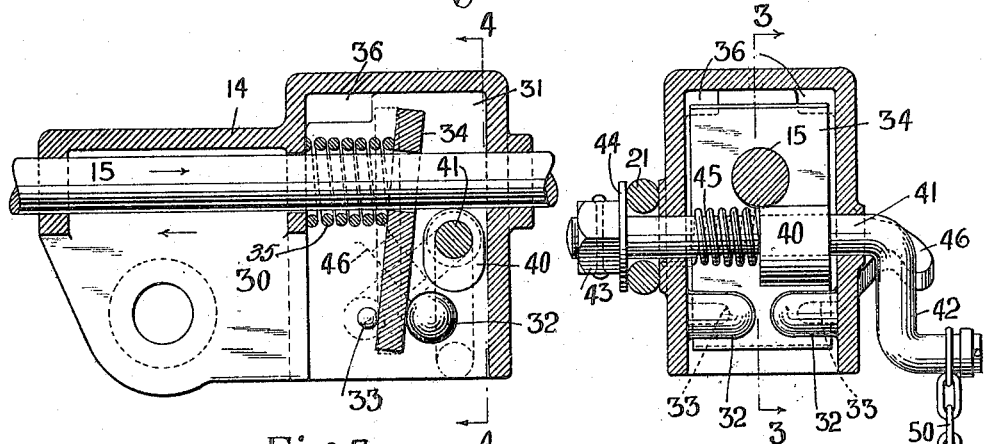
Figure 4:
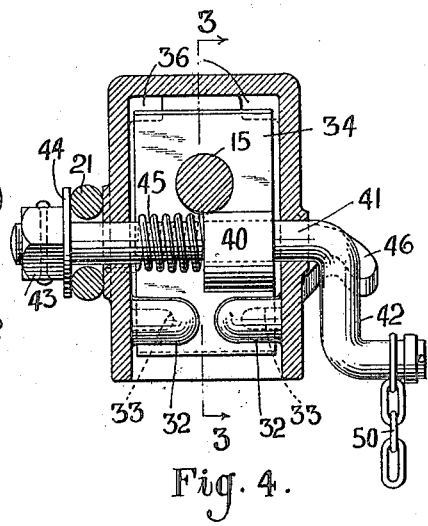
Figure 5:
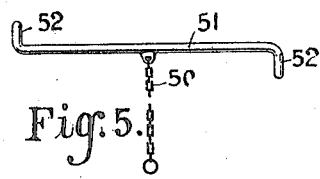

Figure 1 is a side elevation, partially diagrammatic, showing such parts of a brake-rigging applied to a four wheel truck, as will enable one to fully understand the invention. Fig. 2 is a detail view of several of the directly associated parts constructed in standard size for immediate application to many forms of trucks. Fig. 3 is a sectional detail view of the take up box. Fig. 4 is an end sectional view of the parts shown in Fig. 3. Fig. 5 is a detail view of one of the parts. Fig. 6 is a view similar to Fig. 1 showing some slight modifications.

While the present invention will hereinafter be described with relation to its application to a four wheel truck of standard size, it is, of course, to be understood that the features of the present invention are applicable to any brake rigging using live and dead levers.

Referring now to the drawings in detail, and more particularly to Fig. 1, 5 denotes the wheels of a four-wheel truck which support the truck framing and bolster 6. Brake-shoes 7 are designed to co-act with the periphery of the wheels, and are mounted upon brake-beams 8 operated by live and dead levers 10 and 11, respectively. The lower parts of these levers are connected by a bottom rod 12 and the upper end of the live lever 10 is connected by a pull rod 13 with the power cylinder in the usual manner. In the present device the upper part of this dead lever 11 is provided with an adjusting box 14 which partially incloses a holding rod 15, one end of which is pivotally mounted upon a lug 16 upon the bolster 6. This adjusting box, which will be hereinafter described more in detail, is provided at one side with the friction clutch device 20 co-acting with the slotted end 21 of an adjusting rod 17 shown in detail in Fig. 2. This device keeps the dead lever from travel in either direction when brakes are not in use as might occur in rough handling of the cars. The opposite end of this rod is provided with an adjustable U-shaped clamp stop 19 and slot 22 surrounding a pivoted pin 23 also holding the pull rod 13 at the upper end of the live lever 10 thereby to permit a predetermined amount of travel of the live lever before any actuation of the automatic take up and adjusting devices occurs.

Intermediate the slotted ends 21 and 22 of the rod 17 is provided a spring 24, always under slight compression and adapted to be further compressed under conditions hereinafter set forth. A supporting and anchoring tensioning link 25 is provided with a loop 26 at one end surrounding the body portion of the rod 17 intermediate the slotted ends 21 and 22, and is provided at its opposite end with an anchor-eye 27 adapted to be flexibly secured to the lug 16 by the same pin or fastening device which holds the rod 15.

It will thus be seen that as the brake beams are actuated and the upper end of the live lever 10, Fig. 1, and pivot pin 23 will first travel to the end of the slot 22, and if further movement is required will exert a direct pull on rod 17 which will cause the slotted end 21 to slip through the friction clutch device 20, an amount exactly equal to the wear of the shoes and simultaneously cause a compression of the spring 24 by reason of the loop 26, which is held against movement toward the left by means of the anchoring eye 27.

The adjusting box which is shown more clearly in Figs. 3 and 4 preferably comprises a housing 30 having an inclosed chamber 31, protecting the parts from ice and snow, through which the holding rod 15 passes. At the lower part of the chamber 31 are two compactly arranged stops 32 and 33 which may be inexpensively cast integrally with the member 30, and are adapted to support and hold therebetween a clutch 34 having an opening loosely surrounding the rod 15, thereby to bite into the rod when canted to one side. A coiled spring 35 also surrounds the rod, and acts and reacts respectively against the wall of the chamber and the clutch so as to hold it in position as clearly shown in Fig. 3. A stop 36 formed in the upper part of the chamber 31 limits the movement of the clutch to a vertical dotted line position in the opposite direction.

It will thus be seen that this clutch is so positioned and arranged with respect to the holding-rod 15 as to permit a relative movement of the box 30 with respect to the rod toward the left, but will positively prevent a movement of the box in an opposite direction.

Above the stop 33 is an eccentric clutch release cam 40 mounted upon a rock-shaft 41 which latter extends through the sides of the box and is provided at one end with a crank 42, and at the opposite end with a threaded adjusting nut 43 and washer 44 constituting the above mentioned friction clutch device for guiding the slotted end 21 of the adjusting rod 17 between the washer 44 and the adjacent wall of the box 30. A spring 45 within the box co-acts with the side of the cam 40 to urge the same toward the right thereby placing the proper amount of friction upon the loop 21 to prevent abnormal movement or creeping as might occur when coupling cars.

On the outer side of the box 30 adjacent the crank 42 is a beveled lug 46 adapted to co-act with the crank 42 in such a manner that as the crank is raised toward the horizontal the shaft 41 will be moved bodily toward the left slightly compressing the spring 45 and releasing the friction of the washer 44 upon the loop, and at the same time moving the clutch dog to its vertical dotted line position thereby to permit a free movement of the box 30 with respect to the rod 17 as when replacing the worn brake-shoes, requiring the return of the parts to their initial position, for example. The end of this crank 42 is connected by means of a chain 50 with a transversely disposed crank shaft 51, Fig. 5. This rod 51 is provided with a crank 52 at each end extending in opposite directions whereby the rod 51 assumes a balanced position at all times. It is, of course, to be understood that suitable supports for this rod 51 are provided on the truck as may be necessary. By means of these cranks 52 the friction device and clutch may be released from the side of the car without necessitating an employee going beneath the car while in transit as prohibited by the Interstate Commerce rules.

The modification shown in Fig. 6 is within the scope of the present invention and illustrates a different construction of certain parts; for instance the adjusting rod 17 is provided with a loop or eye 55 surrounding the pull rod 13 and operating between two stops 56 and 57 adjustable thereon. The pull rod has a predetermined travel and always returns to a normal position against a stop 58 under the action of brake beam release springs or return spring 60 connecting the live and dead levers. The box 30 is the same as above described only the clutch and friction device are released by means of a hand rod 61 extending toward the end of the car and passing freely through a holding lug 62 on the car end sill 63. When replacing brake shoes and returning the parts to normal position, this rod is pushed in manually which turns the crank 42 to release the clutch and friction devices as above described. The entire mechanism, with the exception of this member, is supported from the truck and the take-up devices from the brake rigging.

It is thought that the operation and method of use of the device is clear from the above disclosure. A brief statement, however, of the operation of the form shown in Fig. 1 is substantially as follows: On application of the brakes the pull rod 13 is moved toward the left under the actuation of the power cylinder, and its connection with the upper end of the live-lever will move the same to carry the brake-shoe into engagement with the periphery of the adjacent wheel. The reaction at the lower end of the live-lever will carry the other brake-shoe into contact with its adjacent wheel, the upper end of the dead-lever being relatively fixed. On wearing of the brake-shoes, the predetermined travel permitted the live-lever by the slot 22 and adjustable stop 19 will be more than taken up and cause a gradual movement of the adjusting rod bodily toward the left. Such movement will overcome the holding of the friction clutch-device 20 adjacent the adjustment box and cause the same to slip along the slot 21 the exact degree of false travel of the brake rigging and the spring 24 will be further compressed by means of the loop 26 a corresponding amount. On release of the brakes the live and dead levers tend to return easily by gravity to normal position under action of the release spring and restore equilibrium between the forces exerted on these levers until the pivot pin 23 coacts with the stop 19 at the right. The compressed spring 24 will then operate to move the adjusting rod 17 bodily toward the right as the spring expands, and reacts against the anchored loop 26. The expansion of this spring will act through the friction-clutch device 20 and cause a corresponding or equal movement of the adjusting box to the right along the rod 15 passing therethrough, thus insuring constant and predetermined piston travel at all times.

Referring to Fig. 3 it will be noted that such bodily movement is permitted by reason of the position and arrangement of the parts contained in the box. Such automatic adjustments take place from time to time as the brake-shoes wear until the box 14 is moved outwardly to its limit of travel along the rod 15, or until such time as it is deemed necessary to replace the worn brake-shoes. Of course, as the brake-shoes are replaced, an entire readjustment of the mechanism is necessary in order to return the parts to their original or initial position; that is, the returning of the adjusting box 14 to substantially the position shown in Fig. 1 or near the left-hand end of the rod 15.

In order to release the clutch device within the adjusting box without requiring an employee to go under the car, the transverse rod 51 is rotated in either direction by means of the crank 52 to wind the chain 50 thereabout. As the chain is tightened the crank 42 to which it is connected, will be moved upwardly into engagement with the beveled cam 46 and release the friction of the washer 44 upon the loop 21, and at the same time the cam moves the clutch to right angles with rod 15 to permit the parts being returned freely to normal position.

It is thus seen that the present invention provides a simple and practical device which is reliable and efficient in use and operation at all times and in short, one adapted to accomplish, among others, all of the objects and advantages above set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In a device of the character described, in combination, live and dead levers, an actuating member connected with one of said levers, a holding device connected with the other, a take-up member connected directly with the actuating member adapted to be operated on excess travel of the live lever, and friction means yieldable in both directions positioned between the holding device and said take-up member for directly moving the holding device to take up the excess amount of slack caused by excess travel.

2. In a device of the character described, in combination, live and dead levers, an actuating member connected with one of said levers, a holding device directly connected with the other, a take-up member connected with the actuating member and adapted to be operated on excess travel of the live lever, and friction means yieldable in both directions between the holding device and the take-up member for moving the holding device to take up the slack due to excess travel, said take-up member being flexibly supported entirely from the rigid part of the truck.

3. In a device of the character described, in combination, live and dead levers, an actuating member having a connection with one of said levers, a holding device directly connected with the other, a take up member having a lost motion connection with the actuating member adapted to be operated on excess travel of the live lever and means between the holding device and take up member for moving the holding device to take up the exact slack due to excess travel, said means comprising a yielding friction clutch device adapted to permit relative movement under abnormal conditions.

4. In a device of the character described, in combination, live and dead levers, an actuating member connected with one of said levers, a holding device directly connected with the other, a take up device connected with the actuating member adapted to be operated on excess travel of the live lever, and means between the holding device and take up device for moving the holding device to take up the exact slack due to excess travel, said holding device including a holding rod, a positive clutch adapted to operate thereon and a yielding friction clutch connection between the dead lever and take up device.

5. In a device of the character described, in combination, live and dead levers, an actuating member connected with one of said levers, a holding device connected with the other, a take up device connected with the actuating member adapted to be operated on excess travel of the live lever, and means between the holding device and take up device for moving the holding device to take up the exact slack due to excess travel, said holding device including a holding rod mounted on the truck and an intervening yielding friction clutch between the take up device and dead lever permitting normal movement in one direction only.

6. In a device of the character described, in combination, live and dead levers, an actuating member connected with one of said levers, a holding device connected with the other, a take up device connected with the actuating member adapted to be operated on excess travel of the live lever, and means between the holding device and said actuated device for moving the holding device to take up the exact slack due to excess travel, said holding device including a holding rod mounted on the truck and an intervening yielding friction clutch between the take up device and dead lever permitting normal movement in one direction only, and manually operated means for releasing said clutch.

7. In a device of the character described, in combination, live and dead levers, a connecting member connected with one of said levers, a holding device connected with the other and an intervening take-up device between the actuating member and said holding device having a frictional connection with one of said parts yieldable in both directions adapted to be actuated on excess travel of the live lever to actuate the holding device upon release of the brakes.

8. In a device of the character described, in combination, live and dead levers, an actuating member connected with one of said levers, a holding device connected with the other, and an intervening take-up device between the actuating member and said holding device, and having a frictional connection with one of said parts yieldable in both directions, and adapted to be actuated on excess travel of the live lever to actuate the holding device on release of the brakes. said parts being supported from the brake rigging and truck frame.

9. In a device of the character described, in combination, live and dead levers, an actuating member connected with one of said levers, a holding device connected with the other and an intervening take-up device between the actuating member and said holding device having a frictional connection with one of said parts yieldable in both directions adapted to be actuated on excess travel of the live lever to actuate the holding device upon release of the brakes, the connection between the several parts permitting an actuation of the mechanism for the holding device independent of the complete return of the live lever.

10. In a device of the character described, in combination, live and dead levers, an actuating member connected with one of said levers, a holding device connected with the dead lever, and an intervening take up device between the actuating member and said holding device and having a yielding connection with the latter, a housing for said holding device to protect the same from snow and ice, and manually operated means operable from near the side of the car for releasing said holding device.

11. In a device of the character described. in combination, live and dead levers, an actuating member connected with one of said levers, a holding device connected with the dead lever, and an intervening take up device between the actuating member and said holding device and having a yielding connection with the latter, a housing for said holding device to protect the same from snow and ice, and manually operated means operable from near the side of the car for releasing said holding device, said means including a balanced lever adapted to be moved in either direction to release the holding device.

12. In a device of the character described, in combination, live and dead levers, a pull rod connected to one end of the live lever, a spring actuated take up mechanism connected to said live lever, a holding device directly connected with one end of said dead lever and having a yieldable frictional connection with said take up device, said holding device including a housing, a holding rod and a positive clutch dog carried by one and engaging the other within said housing.

13. In a device of the character described, in combination, live and dead levers, a pull rod connected to one end of the live lever, a holding device connected with one end of said dead lever, said holding device including a housing, a holding rod, and a clutch dog carried by one and engaging the other, and a take up device operable on excess travel of the live lever to actuate the holding device on release of the brakes to take up the exact amount of slack due to excess travel.

14. In a device of the character described, in combination, live and dead levers, a pull rod connected to one end of the live lever, a holding device connected with one end of said dead lever and means for adjusting said holding device, said holding device including a housing yieldingly connected with said adjusting means, a holding rod supported from the truck, a positive clutch dog within the housing surrounding the rod adapted to bite into the rod when canted, and means for yieldingly holding the clutch dog in canted position.

15. In a device of the character described, in combination, live and dead levers, a pull rod connected to one end of the live lever, a holding device connected with one end of said dead lever, said holding device including a housing, a holding rod, a clutch dog within the housing carried by one and engaging the other, and a take up device having a lost motion connection with the pull rod operable on excess travel of the live lever to actuate the holding device an amount exactly equal to the slack due to excess travel on release of the brakes, and a yielding friction clutch connection between the holding device and take up device.

16. In a device of the character described, in combination, live and dead levers, a pull rod having a connection with one end of the live lever, a holding device connected with one end of said dead lever, said holding device including a housing, a holding rod, and a clutch dog carried by one and engaging the other, and an adjusting device operable on excess travel of the live lever to actuate the holding device on release of the brakes, a friction clutch connection between the adjusting device and the holding device, and a single means for releasing both friction clutch and clutch dog.

17. In a device of the character described, in combination, live and dead levers, a pull rod having a connection with one end of the live lever, a holding device connected with one end of said dead lever, said holding device including a housing, a holding rod, and a clutch dog carried by one and engaging the other, an adjusting device operable on excess travel of the live lever to actuate the holding device on release of the brakes, a friction clutch connection between the adjusting device and the holding device, and a single means for releasing both friction clutch and clutch dog, said means being operable from a point adjacent the side of the truck.

18. In a slack adjuster for railway trucks, in combination, live and dead levers, a pull rod connected to one end of the live lever, said slack adjuster mechanism forming a movable brake suspension connected to the top ends of the live and dead levers and including an automatic take up and holding device frictionally connected to the upper end of the dead lever.

19. In a slack adjuster for railway trucks, in combination, live and dead levers, a pull rod connected to one end of the live lever, said slack adjuster mechanism forming a movable brake suspension connected to the top ends of the live and dead levers and an automatic take up and holding device attached to the upper end of the dead lever and adapted to hold the exact slack taken up by the take up devices due to excess travel of the live lever.

20. In a slack adjuster for railway trucks, in combination, live and dead levers, a pull rod connected to one end of the live lever, said slack adjuster mechanism forming a movable suspension attached to the top ends of the live and dead levers, an automatic take up and holding device connected thereto and associated with the dead lever and truck bolster to hold the exact slack taken up by the take up device on excess travel of the live lever, said parts being supported by the brake rigging of the truck.

21. In a slack adjuster for railway trucks, in combination, live and dead levers, a pull rod connected to one end of the live lever, said slack adjusting mechanism forming a movable brake suspension connected to the top ends of the live and dead levers, an automatic take up device included in said mechanism, a holding device associated with the dead lever and car bolster adapted to hold the exact slack taken up by the take up device due to excess travel of the live lever, said parts being supported by the brake rigging of the truck and operable independent of the complete return of said live lever.

22. In a slack adjuster for railway trucks, in combination, live and dead levers, a pull rod connected to one end of the live lever adapted to have uniform travel with respect to a fixed point, a return spring for said parts, an automatic take up device frictionally connected with the upper end of the dead lever and adapted to have relative movement with respect thereto and a holding device mounted at the upper end of the dead lever adjacent said frictional connection adapted to hold the exact slack due to excess travel of the live lever and taken up by the take up device.

WILLIAM H. SAUVAGE.

Witnesses:
C. M. NICHOLSON,
P. A. BLAIR.

Copies of this patent may be obtained for five cents each, by addressing the "Commissioner of Patents, Washington, D. C."